Aug. 28, 1928.

F. M. WRABEK 1,682,001

MILKING MACHINE

Filed April 9, 1927      2 Sheets-Sheet 1

Inventor
F. M. Wrabek
By C. A. Snow & Co.
Attorneys.

Aug. 28, 1928.

F. M. WRABEK

MILKING MACHINE

Filed April 9, 1927

Inventor
F. M. Wrabek
By C. A. Snow & Co.
Attorneys.

Patented Aug. 28, 1928.

1,682,001

UNITED STATES PATENT OFFICE.

FRANK M. WRABEK, OF LE SUEUR CENTER, MINNESOTA.

MILKING MACHINE.

Application filed April 9, 1927. Serial No. 182,368.

This invention aims to provide a milking machine of novel form by which the milk may be drawn from the udder of a cow, without taking the teats into the hand of the operator, novel means being provided for operating and controlling those parts of the machine which cooperate directly with the teats and with the udder.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
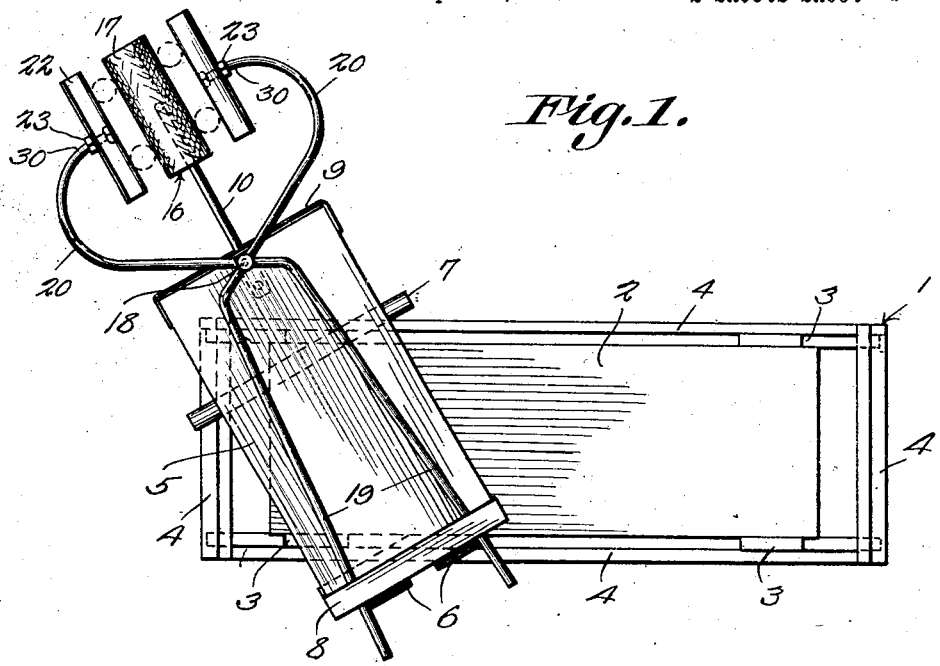
Figure 1 shows in top plan, a device constructed in accordance with the invention.

In carrying out the invention, there is provided a frame 1 which may be of any desired construction. If desired, the frame 1 may be in the form of a bench on which the operator may sit, the frame including a top piece 2, whereunto legs 3 are connected, the legs being joined together by braces 4.

A support 5 in the form of a plate or board is provided. The support 5 is located above the top piece 2 of the frame 1, near to one end of the frame, the support being disposed at an obtuse angle to the longer dimension of the top piece, as Figure 1 will show clearly. One end of the support 5 is connected by hinges 6 with the edge of the top piece 2, the construction being such that the support 5 may be swung vertically for adjustment. Any suitable means may be supplied for holding the support 5 at the desired angle with respect to the top piece 2, as shown in Figure 2. It may be expedient to place a removable prop 7, such as a roller, between the support 5 and the top piece 2. At its inner end, the support 5 is provided with a guide 8 of inverted U shape, the guide 8 extending across the support 5 at one end thereof. A wear strip 9 is secured to the opposite end of the support 5, and is located in the same plane with the support.

Figure 3:
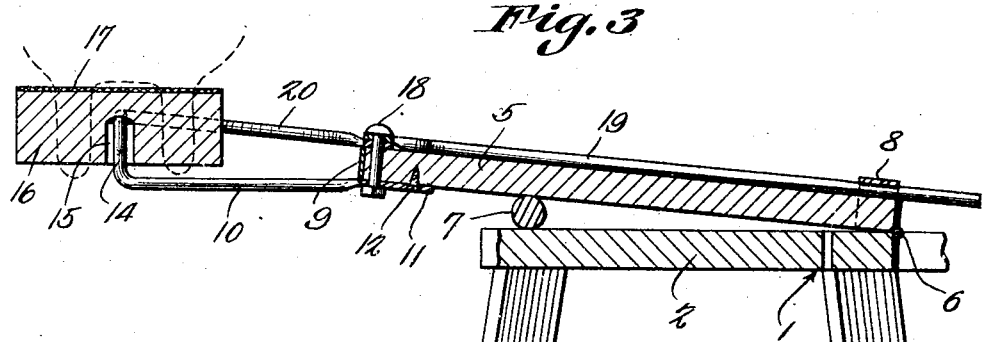
Figure 3 is a sectional view taken longitudinally of the support.

A bracket 10, preferably in the form of a bar, projects forwardly from the support 5, the bracket 10 having a flattened inner end 11 disposed beneath the support 5 and connected thereto by a securing element 12, shown in Figure 3. The flattened end 11 of the bracket 10 forms a washer for a fulcrum member 18, such as a bolt that is extended upwardly through the support 5. At its outer end, the bracket 10 has an upstanding finger 14 which is received loosely in an opening 15 formed in an elongated central abutment 16, the upper edge of the abutment being rounded, and the abutment being provided upon its upper edge and on its sides with a cushion covering 17 shown in cross section in Figure 5.

Figure 5:
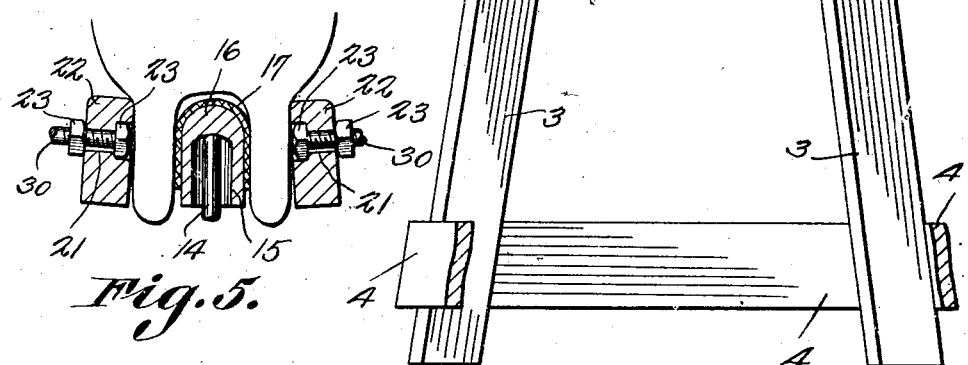
Figure 5 is a sectional view showing the abutment and the jaws in operative relation to the teats and the udder of the cow.

Crossed levers 19 are provided, and are fulcrumed on the bolt 18. The handle ends of the levers 19 slide beneath the guide. The levers 19 are provided with curved arms 20 which slide on the upper edge of the wear strip 9. The levers 19 terminate in ends 30 which are located opposite to each other and nearly in axial alinement, the ends 30 of the arms 20 slanting downwardly a little, as shown in Figure 5. The ends 20 of the levers 19 are received in transverse openings 21 formed in elongated jaws 22 disposed on opposite sides of the central abutment 16. There are nuts 23 on the ends 30 and said nuts hold the jaws 22 in place. The jaws 22 are supplied with recesses 24 which receive the innermost nuts 23. The openings 21 are enlarged slightly, and the nuts 23 preferably do not pinch the jaws 22. The jaws 22, therefore, are mounted on the ends 30 of the levers 19 for tilting movement, and for a slight transverse movement, since the openings 21 are of slightly greater size than the cross section of the ends 30, as shown in Figure 5. The jaws 22 do not stand exactly in vertical positions, but slant downwardly and outwardly. Owing to this construction the pressure of the jaws 22 is applied, first, close to the udder of the cow, and, then, the pressure is carried downwardly along the teats, the operation of hand-milking being simulated closely. The teats are pressed between the abutment 16 and the jaws 22. Because the abutment 16 is mounted loosely at 15, on the finger 14 of the bracket 10, and because the jaws 22 are mounted pivotally and for translatory movement on the ends 30 of the levers 19, the jaws 20 and the abutment 16 can have a certain amount of movement relatively to each other, and there is practically no danger that the teats of the cow will be bruised in the milking operation.

Figure 4:
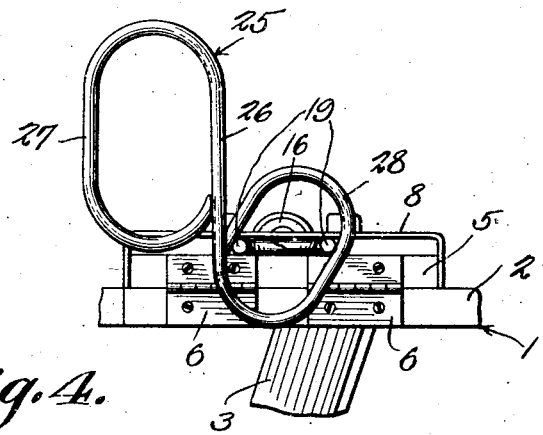
Figure 4 is a fragmental elevation showing the operating means.

An actuating member 25 for the levers 19 is provided, as shown in Figure 4. The actuating member 25 comprises a central body 26, in the form of a bar, the ends of the bar being formed into a loop 27 and into a loop 28, the loops 27 and 28 being located on opposite sides of the body 26, the loop 27 being slightly larger than the loop 28, the extreme outer ends of the levers 19 being received in the loop 28. The axis of the loop 28 is disposed at an acute angle to the axis of the loop 27, as Figure 4 will show.

In practical operation, the operator, seated on the top piece 2 of the frame 1, operates the actuating member 25, the hand of the operator being received in the loop 27, and the loop 28 cooperating with the extremities of the levers 19 to swing the levers on the fulcrum member 18, the jaws 22 being moved toward and away from the central abutment 16, to bring about a milking operation in the way which has been pointed out hereinbefore.

By shifting the prop 7, the support 5 may be swung upward or downward, thereby to adjust the abutment 16 and the jaws 22 so that these parts will cooperate properly with the teats of the cow. The jaws 22, and the abutment 16, may be removed, and be replaced by corresponding parts of different dimensions.

Figure 2:
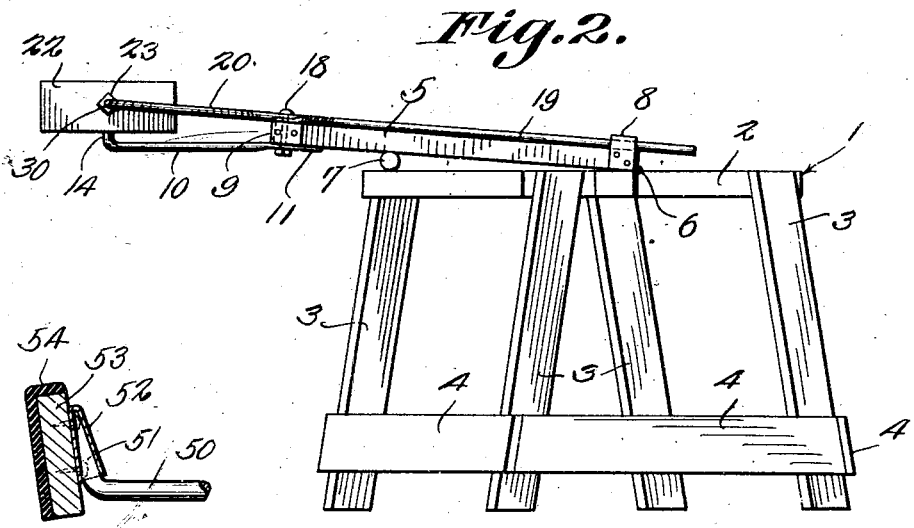
Figure 2 is an elevation.
Figure 6:
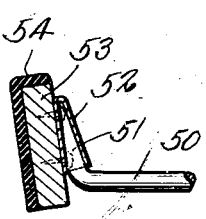
Figure 6 is a sectional view showing a slight modification.

In Figure 6, the arm, corresponding to the part 20 in Figure 1, is marked by the numeral 50, and has a reduced end 51 received for limited movement in a socket 52 on a jaw 53 that corresponds with the jaw 22, the jaw 53 being provided with a yieldable facing 54, made of rubber or any other suitable material.

What is claimed is:—

1. In a device of the class described, an operator's bench, a support hinged to the bench for vertical swinging adjustment, means for holding the support in adjusted vertical positions, an abutment mounted on the support, jaws located on opposite sides of the abutment, and means mounted on the support for moving the jaws toward and away from each other.

2. In a device of the class described, a support, levers fulcrumed on the support, compression milking means carried in part by the levers, and means for actuating the levers, said means embodying an elongated loop mounted to oscillate on the levers, transversely of the levers.

3. In a milking machine, an operator's bench, a support, means for hinging the support to the bench for vertical swinging adjustment, mechanism for engaging the support to produce the aforesaid swinging adjustment, a pair of levers crossed upon themselves and fulcrumed at their point of crossing on the support, the levers being accessible at one end for manipulation at a point adjacent one end of the support, the opposite ends of the levers projecting beyond the support, jaws on the last-specified ends of the levers, and an abutment disposed between the jaws, and means for carrying the abutment on the support.

In testimony that I claim the foregoing as my own, I have hereto affixed my signature.

FRANK M. WRABEK.